Nov. 2, 1948.  C. A. THOMAS  2,452,966
DYNAMOELECTRIC MACHINE
Filed Dec. 29, 1945

Inventor:
Charles A. Thomas,
by Rowell & Mack
His Attorney.

Patented Nov. 2, 1948

2,452,966

UNITED STATES PATENT OFFICE 2,452,966

DYNAMOELECTRIC MACHINE

Charles A. Thomas, Fort Wayne, Ind., assignor to General Electric Company, a corporation of New York Application December 29, 1945, Serial No. 638,059

10 Claims. (Cl. 318—297)

1

My invention relates to dynamoelectric machines and particularly to direct current machines which are adapted to be operated in both directions of rotation.

An object of my invention is to provide an improved dynamoelectric machine which is adapted to operate in both directions of rotation with substantially the same energizing current for a given load condition.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
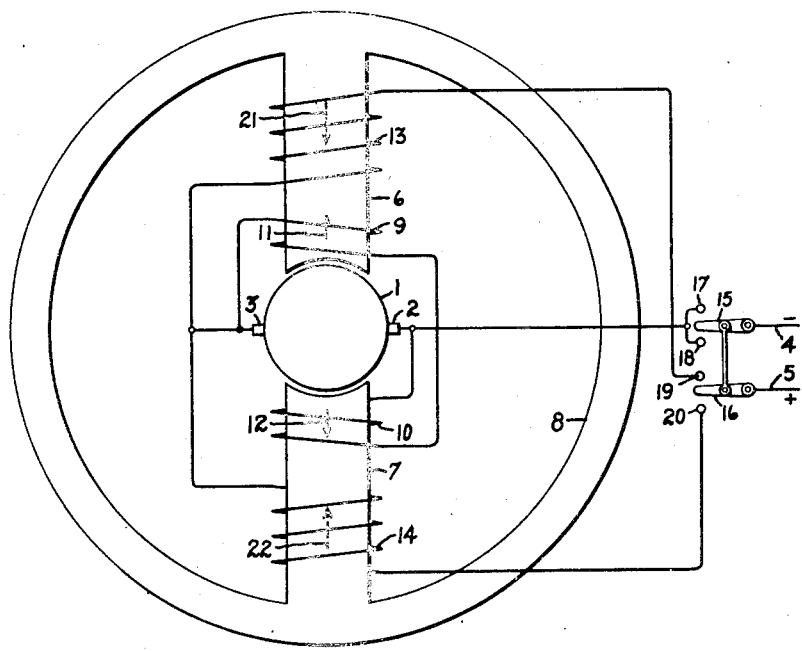
Figure 2:
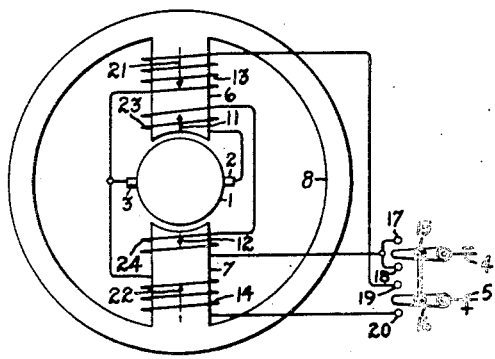
Figure 3:
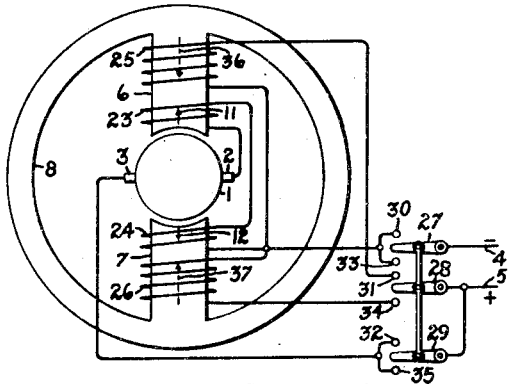

In the drawing, Fig. 1 is a schematic illustration of the preferred embodiment of my improved dynamoelectric machine; Fig. 2 is a schematic illustration of another embodiment of my improved dynamoelectric machine; and Fig. 3 is a schematic diagram of a third embodiment of my improved dynamoelectric machine.

Referring to the drawing, I have shown in Fig. 1 an embodiment of my improved dynamoelectric machine provided with a rotatable armature member 1 having a conventional winding and commutator to which energizing current is adapted to be provided by current collector brushes 2 and 3 from a suitable source of power 4—5. This machine is provided with a stationary field member having at least two pole pieces 6 and 7 of magnetic material magnetically connected by any suitable magnet frame 8. The machine is magnetically excited by a field exciting winding having at least two coil sections or parts 9 and 10 shown in this embodiment as connected in series with each other and in shunt with the armature 1 and arranged on the pole pieces 6 and 7, respectively, to provide at least two field poles of the same polarity to these pole pieces of substantially equal magnetomotive force, as indicated by the arrows 11 and 12. A main field exciting winding is provided which also is formed of two parts 13 and 14 arranged on the pole pieces 6 and 7, respectively, and adapted to be connected in series with the armature 1 and the two field exciting winding coil sections 9 and 10. As shown, each of the parts 13 and 14 of this main field exciting winding is arranged on a separate one of the pole pieces and is adapted to provide magnetic excitation thereto of magnetic polarity opposite to and substantially double in magnitude to the magnetomotive force of the first-mentioned shunt

2 connected field exciting winding excitation provided by the coil sections 9 and 10. The direction of rotation of the armature 1 is selected by energizing only one of the parts 13 or 14 of the main field exciting winding, and this selection is made by selectively connecting one of these parts and the armature with the shunt connected field exciting winding to the source of electrical power supply 4—5 through a double-pole double-throw reversing switch having contactors 15 and 16 adapted to complete electrical circuits through contacts 17 and 18, and 19 and 20, respectively, for selectively providing a resultant magnetic excitation of opposite polarity to each of the field poles 6 and 7 without reversal of the energization of the armature. As shown, if the double-pole double-throw switch is closed on the contacts 17 and 19, current will flow through the part 13 of the series connected field exciting winding and provide an excitation as indicated by the dotted arrow 21 and then flow through the field exciting winding sections 9 and 10 to provide excitation as indicated by the arrows 11 and 12 and also flow through the armature 1 to the contact 17. Since the field exciting winding part 9 provides substantially half the excitation provided by the field exciting winding part 13, the net or resultant excitation of the pole piece 6 is in the direction of the arrow 21, as provided by the field exciting winding 13 and equal to half the excitation of this part of the main field exciting winding, and the excitation of the pole piece 7 is due only to the excitation of the field exciting winding part 10 which is of opposite polarity and substantially equal to the net excitation provided to the pole piece 6, such that the motor runs in one direction with full excitation. In order to reverse the direction of rotation of the armature, the double-pole double-throw switch may be thrown to complete a circuit through the contacts 18 and 20, in which case the main field exciting winding part 14 is energized and a component of excitation, indicated by the dotted arrow 22, is provided which is opposed by the component of excitation 12 of the field exciting winding part 10. with a net or resultant excitation to the pole piece 7 equal to half the excitation provided by the main field exciting winding 14 and substantially equal and opposite in polarity to the excitation 11 provided by the field exciting winding part 9 to the pole piece 6. This produces a net or resultant magnetic excitation to the field member of the machine which is substantially equal in magnitude and opposite in polarity to the excitation provided when the double-pole double-throw reversing switch is closed to energize the contacts 17 and 19 and the energization of the armature 1 through the contact collector brushes 2 and 3 remains unchanged, thereby producing a reversal in direction of rotation of the rotatable member 1 of the machine with substantially equal excitation for both directions of rotation. Furthermore, with this field exciting winding arrangement, the field exciting winding parts 9 and 10 provide the effect of a shunted resistance across the armature 1 and, therefore, further stabilize the operation of this machine in both directions of rotation and help to maintain the same load current for any given load condition.

In Fig. 2, I have shown another embodiment of my invention in which a rotatable armature member 1 is provided with collector brushes 2 and 3, as in the arrangement shown in Fig. 1, which are adapted to be energized from a suitable source of direct current supply 4—5. In this construction, a relatively stationary field member is provided having at least a pair of pole pieces 6 and 7 suitably connected together by a magnet frame 8 of magnetic material. Excitation is provided to the machine by a field exciting winding comprising two parts 23 and 24 which are connected in series with each other and in series with the armature through the collector brush 2 and are adapted to provide excitation of equal magnitude and like polarity to the pole pieces 6 and 7 and to be energized in the same sense by being connected to the same side of the source of electrical power supply 4—5 for either direction of rotation of the machine. A main field exciting winding having two parts 13 and 14 adapted to be connected in series with the armature 1 and the field exciting winding parts 23 and 24 also is provided and is connected in the same manner to the source of power 4—5 as that shown in Fig. 1. As in the arrangement shown in Fig. 1, a double-pole double-throw reversing switch having contactors 15 and 16 is provided and is adapted to complete an electrical circuit through the machine by engagement with contacts 17 and 19 or contacts 18 and 20. When the double-pole double-throw switch is closed on the contacts 17 and 19, the field exciting winding parts 23 and 24 provide excitation of equal and like polarity to the two pole pieces 6 and 7, while the main field exciting winding part or section 13 is arranged to provide a component of excitation to the pole piece 6, indicated by the arrow 21, substantially double the magnitude of the component of excitation provided by the field exciting winding part 23 and opposite in polarity with a resultant or net excitation of the pole piece 6 equal to substantially half the excitation of the field exciting winding part 13 and opposite in polarity to the excitation provided by the field exciting winding part 24 to the pole piece 7. With this connection to the source of power 4—5, the field exciting winding part 14 is deenergized and has no effect on the excitation of the machine. If the double-pole double-throw switch is thrown in the opposite direction so as to energize the contacts 18 and 20, the field exciting winding parts 23 and 24 and the armature 1 are energized in the same direction as before, whereas the field exciting winding part 13 is deenergized and the field exciting winding part 14 is energized, as indicated by the dotted arrow 22, opposite in polarity to the component of excitation 12 of the field exciting winding part 24 and substantially double in magnitude, providing a net or resultant excitation to the field pole piece 7 equal to half the excitation 22. This excitation of the pole piece 7 is substantially equal and opposite in polarity to the excitation 11 provided by the field exciting winding part 23 and, therefore, maintains the net or resultant excitation provided to the machine for this direction of energization substantially the same as that for the opposite energization provided by closure of the energization of the contacts 17 and 19. This, therefore, also provides for substantially equal and opposite excitation to the dynamoelectric machine with substantially equal and same direction of energization of the armature of the machine dependent upon the selective closure of the reversing switch and energization of the field exciting winding, and, therefore, maintains substantially equal current through the machine for a given load condition for opposite directions of rotation of the machine.

In Fig. 3 I have shown a third embodiment of my invention in which the dynamoelectric machine is provided with a rotatable armature member 1 and current collector brushes 2 and 5 which are adapted to supply energizing current to a suitable armature winding through a conventional commutator. This machine is provided with a field exciting winding having two parts 23 and 24 connected in series with the armature 1 as in the arrangement shown in Fig. 2 and arranged on pole pieces 6 and 7, respectively, which are formed of magnetic material and connected together by a suitable magnet frame 8. The two field exciting winding parts 23 and 24 are adapted to provide components of excitation to the pole pieces 6 and 7, as indicated by the arrows 11 and 12, of equal magnitude and like polarity. In this arrangement, the machine also is provided with excitation by a main field exciting winding having two parts 25 and 26 arranged on the pole pieces 6 and 7 and each adapted to provide substantially double the magnetomotive force of each of the field exciting winding parts 23 and 24 and of opposite polarity to the excitation of these latter two field exciting winding parts. In order to provide a reversal of the excitation of the machine for reversal of rotation of the rotatable member 1, the field exciting winding parts 25 and 26 are adapted to be selectively energized by a suitable three-pole double-throw reversing switch having contactors 27, 28, and 29 connected to a suitable source of direct current electrical power supply 4—5. The three-pole double-throw switch is adapted to close the source of electrical power supply circuit for energizing the dynamoelectric machine through contacts 30, 31, and 32 or contacts 33, 34, and 35. In this arrangement, if the three-pole double-throw switch is closed on contacts 30, 31, and 32, the field exciting winding parts 23 and 24 and the armature 1 are connected in series and the field exciting winding part 25 is connected in shunt with the armature 1 and the series field exciting winding parts 23 and 24 and is energized to provide a component of excitation indicated by the dotted arrow 36 substantially double in magnitude to the component of excitation 11 provided by the field exciting winding part 23 and opposite in polarity thereto, such that the net or resultant excitation of the pole piece 6 is substantially equal to half the excitation provided by the field exciting winding part 25 and is of opposite polarity to the excitation indicated by the arrow 12 provided by the field exciting winding part 24 to the pole piece 7. With this energization of the machine, the field exciting winding part 26 remains deenergized. If the three-pole double-throw switch is closed on the other set of contacts 33, 34, and 35, the armature 1 and the series connected field exciting winding parts 23 and 24 remain energized in the same direction as when the double-throw switch is closed in the opposite direction, while the field exciting winding part 25 is deenergized and the field exciting winding part 26 is energized to provide a component of excitation to the pole piece 7, as indicated by the dotted arrow 37, opposite in polarity to the component of excitation 12 provided by the field exciting winding part 24 and substantially double in magnitude, such that the net or resultant excitation of the pole piece 7 is substantially half of the component of excitation 37 and equal in magnitude and opposite in polarity to the component of excitation 11 of the field exciting winding part 23 provided to the pole piece 6, thus maintaining substantially the same excitation of the field member of the machine as when the reversing switch is closed in the opposite direction. This provides for reversal of the direction of excitation of the field member of the machine, maintaining substantially the same magnitude of excitation, thereby providing for a selective reversal of rotation of the machine, maintaining substantially equal current through the machine for the same load conditions.

While I have illustrated and described several embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a rotatable member with a winding, a field member having pole pieces and a main field exciting winding on said pole pieces comprising two parts arranged to provide a like polarity to all of said pole pieces, means including a second field exciting winding on said pole pieces comprising two parts respectively arranged in opposition to said two parts of said main field exciting winding and arranged to provide substantially one-half the excitation of either of said two main field exciting winding parts to each of said pole pieces, and means for selectively energizing one or the other of said two parts of said main field exciting winding for providing excitation of opposite polarity to adjacent of said pole pieces and for selectively reversing the polarity of said pole pieces for operation of the rotatable member of the machine in opposite directions.

2. A dynamoelectric machine having an armature member and a field member, means for magnetically exciting said field member arranged to provide at least two field poles of like polarity and of substantially equal magnetomotive force, other means for exciting said field member arranged to provide magnetic excitation to each of said field poles of magnetic polarity opposite to and substantially double the magnetomotive force of said first-mentioned excitation means to each pole, and means for selectively providing excitation by said other means to either one of said field poles and to only one at a time for providing a resultant magnetic excitation of opposite polarity to each of said field poles substantially equal to that of said first-mentioned exciting means and for selectively reversing said polarity without reversal of the energization of said armature.

3. A dynamoelectric machine having a rotatable armature member and a stationary field member, means for magnetically exciting said field member including a field exciting winding having at least two parts connected in circuit with said armature and arranged to provide at least two field poles of like polarity and of substantially equal magnetomotive force, a second field exciting winding connected in circuit with said armature and having two parts arranged to provide magnetic excitation to said field poles of magnetic polarity opposite to and substantially double the magnetomotive force of said first-mentioned field exciting winding excitation thereto, and means for selectively connecting each one of said two parts of said second field exciting winding one at a time and said armature with said first-mentioned field exciting winding to a source of electrical power supply for providing a resultant magnetic excitation of opposite polarity to each of said field poles and for selectively reversing said polarity without reversal of the energization of said armature.

4. A dynamoelectric machine having an armature member and a field member having at least a pair of pole pieces, means for magnetically exciting said field member pole pieces including a field exciting winding connected in circuit with said armature and arranged to provide at least two field poles of like polarity to said pole pieces of substantially equal magnetomotive force, a second field exciting winding connected in circuit with said armature and having two parts arranged one on each of said pole pieces arranged to provide magnetic excitation to said field poles of magnetic polarity opposite to and substantially double the magnetomotive force of said first-mentioned field exciting winding excitation thereto, and means for selectively connecting each one of said two parts of said second field exciting winding one part at a time and said armature with said first-mentioned field exciting winding to a source of electrical power supply for providing a resultant magnetic excitation of opposite polarity to each of said field poles and for selectively reversing said polarity without reversal of the energization of said armature.

5. A dynamoelectric machine having a rotatable armature member and a stationary field member having at least a pair of pole pieces, means for magnetically exciting said field member pole pieces including a field exciting winding connected in shunt with said armature and arranged to provide field poles of like polarity to said pole pieces each of substantially equal magnetomotive force, a second field exciting winding connected in series with said armature and having two parts arranged one on each of said pole pieces and arranged to provide magnetic excitation to said field poles of magnetic polarity opposite to and substantially double the magnetomotive force of said shunt connected field exciting winding excitation thereto, and means for selectively connecting each one of said two parts of said series connected field exciting winding one part at a time and said armature with said shunt connected field exciting winding to a source of electrical power supply for providing a resultant magnetic excitation of opposite polarity to each of said field poles and for selectively reversing said polarity without reversal of the energization of said armature.

6. A dynamoelectric machine having a rotatable armature member and a stationary field member, means for magnetically exciting said field member including a field exciting winding having at least two parts connected in series with said armature and arranged to provide at least two field poles of like polarity and of substantially equal magnetomotive force, a second field exciting winding connected in series with said armature and having two parts arranged to provide magnetic excitation to said field poles of magnetic polarity opposite to and substantially double the magnetomotive force of said first-mentioned field exciting winding excitation thereto, and means for selectively connecting each one of said two parts of said second field exciting winding one part at a time and said armature with said first-mentioned field exciting winding to a source of electrical power supply for providing a resultant magnetic excitation of opposite polarity to each of said field poles and for selectively reversing said polarity without reversal of the energization of said armature.

7. A dynamoelectric machine having a rotatable armature member and a stationary field member having at least a pair of pole pieces, means for magnetically exciting said field member pole pieces including a field exciting winding connected in series with said armature and arranged to provide at least two field poles of like polarity to said pole pieces of substantially equal magnetomotive force, a second field exciting winding connected in series with said armature and having two parts arranged one on each of said pole pieces arranged to provide magnetic excitation to said field poles of magnetic polarity opposite to and substantially double the magnetomotive force of said first-mentioned field exciting winding excitation thereto, and means for selectively connecting each one of said two parts of said second field exciting winding one at a time and said armature with said first-mentioned field exciting winding to a source of electrical power supply for providing a resultant magnetic excitation of opposite polarity to each of said field poles and for selectively reversing said polarity without reversal of the energization of said armature.

8. A dynamoelectric machine having a rotatable armature member and a stationary field member, means for magnetically exciting said field member including a field exciting winding having at least two parts connected in series with said armature and arranged to provide at least two field poles of like polarity and of substantially equal magnetomotive force, a second field exciting winding connected in shunt with said armature and having two parts arranged to provide magnetic excitation to each of said field poles of magnetic polarity opposite to and substantially double the magnetomotive force of said series connected field exciting winding excitation thereto, and means for selectively connecting either one of said two parts of said shunt connected field exciting winding one part at a time and said armature with said series connected field exciting winding to a source of electrical power supply for providing a resultant magnetic excitation of opposite polarity to each of said field poles and for selectively reversing said polarity without reversal of the energization of said armature.

9. A dynamoelectric machine having a rotatable armature member and a stationary field member having at least a pair of pole pieces, means for magnetically exciting said field member pole pieces including a field exciting winding connected in series with said armature and arranged to provide field poles of like polarity to said pole pieces each of substantially equal magnetomotive force, a second field exciting winding connected in shunt with said armature and having two parts arranged one on each of said pole pieces and arranged to provide a magnetic excitation to said field poles of magnetic polarity opposite to and substantially double the magnetomotive force of said series connected field exciting winding excitation thereto, and means for selectively connecting each one of said two parts of said shunt connected field exciting winding one at a time and said armature with said series connected field exciting winding to a source of electrical power supply for providing a resultant magnetic excitation of opposite polarity to each of said field poles and for selectively reversing said polarity without reversal of the energization of said armature.

10. A dynamoelectric machine having a rotatable armature member and a stationary field member, means for magnetically exciting said field member including a field exciting winding having at least two parts connected in shunt with said armature and arranged to provide at least two field poles of opposite polarity and of substantially equal magnetomotive force, a second field exciting winding connected in series with said armature and having two parts arranged to provide magnetic excitation to said field poles of magnetic polarity opposite to and substantially double the magnetomotive force of said shunt connected field exciting winding excitation, and means for selectively connecting each one of said two parts of said series connected field exciting winding and said armature with said shunt connected field exciting winding to a source of electrical power supply for selectively providing a resultant magnetic excitation of opposite polarity to each of said field poles without reversal of the energization of said armature.

CHARLES A. THOMAS.

REFERENCES CITED

The following references are of record in the file of this patent:

UNITED STATES PATENTS

| Number | Name | Date |
|---|---|---|
| 1,667,647 | Alexanderson | Apr. 24, 1928 |